United States Patent [19]
Dupont et al.

[11] Patent Number: 5,876,829
[45] Date of Patent: *Mar. 2, 1999

[54] COMPOSITE ARTICLE AND PROCESS FOR MANUFACTURING IT

[75] Inventors: Serge Dupont, Vilvoorde; Didier Delimoy, Dion-Valmont; Thierry De Bruille, Rixensart, all of Belgium

[73] Assignee: Solvay (Société Anonyme), Brussels, Belgium

[*] Notice: This patent issued on a continued prosecution application filed under 37 CFR 1.53(d), and is subject to the twenty year patent term provisions of 35 U.S.C. 154(a)(2).

[21] Appl. No.: 504,388

[22] Filed: Jul. 19, 1995

[30] Foreign Application Priority Data

| Jul. 20, 1994 | [BE] | Belgium | 09400689 |
| Dec. 27, 1994 | [BE] | Belgium | 09401178 |

[51] Int. Cl.$^6$ .............. B32B 5/28; B32B 29/02; H05B 3/00
[52] U.S. Cl. .......... 428/114; 428/105; 428/107; 428/109; 428/113; 428/365; 428/359; 428/372; 156/172; 156/173; 156/175; 156/180; 156/203; 156/244; 156/273; 156/275
[58] Field of Search .............. 156/172, 173, 156/175, 180, 203, 244, 273, 275; 428/359, 298.4, 114, 365, 372, 247.4, 248.4, 105, 107, 109, 113

[56] References Cited

U.S. PATENT DOCUMENTS

| 3,769,127 | 10/1973 | Goldsworthy .............. 156/172 |
| 4,705,660 | 11/1987 | Demarle . |

FOREIGN PATENT DOCUMENTS

| 0158631 | 10/1985 | European Pat. Off. . |
| 0530074 | 3/1993 | European Pat. Off. . |
| 2005377 | 4/1979 | United Kingdom . |
| 2077880 | 12/1981 | United Kingdom . |

OTHER PUBLICATIONS

Jang, Advanced Polymer Composites, p. 64, 1994.

*Primary Examiner*—Richard Weisberger
*Attorney, Agent, or Firm*—Venable; John W. Schneller

[57] ABSTRACT

Composite article comprising an injected hollow body or a solid body based on at least one plastic A, reinforced by at least one bundle of continuous reinforcing fibers, the bundle being wound externally at its surface, substantially perpendicular to its axis, as well as by reinforcing fibers dispersed within it, substantially parallel to its axis, and continuous process for manufacturing it.

11 Claims, No Drawings

COMPOSITE ARTICLE AND PROCESS FOR MANUFACTURING IT

The present invention relates to a composite article based on plastic reinforced by means of reinforcing fibres.

TECHNOLOGY REVIEW

Plastics are currently widely used for the manufacture of all types of articles, especially for the manufacture of injected or blown hollow bodies, or else for the manufacture of solid bodies such as profiles or bars.

In order to reduce the wall thickness of certain other articles, it has already been proposed to reinforce them by means of reinforcing fibres arranged at their surface. Such a solution is especially disclosed in Document GB-A-2,077, 880 which describes a pipe made of plastic reinforced both by bundles of continuous reinforcing fibres parallel to its axis and arranged at its surface and by bundles of helically wound continuous reinforcing fibres (wound at an angle which can vary from 30° to 90°).

The manufacture of such articles using a continuous process is quite complex; this is because, in addition to one or more rotating reels for paying out bundles of continuous reinforcing fibres serving to produce the helical reinforcement around a central body, it is necessary to provide a large number of fixed pay-out reels in order to produce the axial reinforcement (a number which is all the greater the closer together the bundles of continuous fibres used for the axial reinforcement and the greater the external dimensions of the article).

Furthermore, the fact that the bundles of continuous axial reinforcing fibres are arranged in a thin thickness so as to be concentrated on the external surface of the body can prejudice them taking up the axial forces. In addition, this uptake depends on the adhesion of the bundles to the central body, which adhesion itself depends greatly on operating conditions, for example on the temperature of these bundles and of the body, on the accuracy of the "deposition" of the bundles or else on the pressure exerted on them during their application.

In a novel manner, the subject of the present invention is therefore a type of composite article which exhibits excellent long-term strength and can be manufactured simply.

SUMMARY OF THE INVENTION

More precisely, the invention relates to a composite article comprising an injected hollow body or a solid body based on at least one plastic A, reinforced by at least one bundle of continuous reinforcing fibres, the bundle being wound externally at its surface, substantially perpendicular to its axis, which is characterized in that the said body is furthermore reinforced by reinforcing fibres dispersed within it, substantially parallel to its axis.

DETAILED DESCRIPTION OF THE INVENTION

Injected hollow body is understood to mean any type of hollow part, such as a bottle for example, obtained by one of the known injection processes, with or without blowing, for example by injection over a meltable core, over a soluble core or over an inflatable core, or by gas-assisted injection. By extension, we also term here as injected hollow bodies parts, such as tanks, manufactured by extrusion-blowing, which have finished dimensions.

Solid body is understood to mean any type of solid part, whether it has been manufactured by injection, by extrusion or by any other process. By way of examples of solid bodies, mention may especially be made of bars, profiles, etc.

Advantageously, the bundle of continuous reinforcing fibres is impregnated by a plastic B. Such a bundle, generally termed COFIT (continuous fibre impregnated by a thermoplastic), may in particular be obtained by impregnating the continuous reinforcing fibres with a polymer in the molten state. It may also be obtained by employing a co-mingled bundle of continuous reinforcing fibres and of continuous plastic fibres. It may also be obtained by employing a bundle of continuous reinforcing fibres between which a powdered plastic has been dispersed. In the last two ways of obtaining the bundle, it is, of course, absolutely essential to heat it, before winding it around a body, so that the plastic melts and impregnates the reinforcing fibres uniformly.

According to a preferred variant, the body is reinforced by two bundles of continuous reinforcing fibres wound helically in opposite directions.

Preferably, the bundle or bundles of continuous reinforcing fibres arranged helically around the body are wound so as to be approximately perpendicular to the axis of the latter. Preferably, they are wound at more than 80° with respect to the said axis.

Advantageously, the article is coated on the outside with a finishing layer comprising a plastic C. This finishing layer, which may be made by any known technique, especially by over-extrusion or extrusion-coating, has several advantageous effects—first of all, it protects the bundle(s) of continuous reinforcing fibres from any mechanical degradation, especially during handling, transportation and use of the article. It may also chemically protect the bundles of reinforcing fibres, the body and its possible contents. It may especially prevent contaminants, present on the outside of a hollow article in accordance with the invention, from contaminating the fluid that it contains. Finally, application of the finishing layer by means of a sizing device enables the external surface of the composite article to be made dimensionally very precise, something which makes it easier to insert it into orifices or into connection elements, etc.

The article may also possibly comprise other layers, for example an impermeability layer consisting of a thin metal foil wound around the body reinforced by the bundle(s) of reinforcing fibres. In such an article, the finishing layer, which is arranged over the said metal foil, also mechanically protects the latter.

The plastics A, B, or C mentioned hereinabove may essentially consist of one or more polymers of any type, whether thermosetting or thermoplastic. Often A, B or C essentially consist of one or more thermoplastic polymers. Preferably, the plastics employed are thermoplastics, that is to say that the polymer or polymers of which they are essentially comprised are thermoplastic polymers. If several different polymers as a blend are used for the body (plastic A), they must be mutually compatible, or rendered compatible by the use of one or more suitable compatibilizers so that the body exhibits satisfactory mechanical properties. This remark applies similarly to the plastics B and C. By way of example of thermoplastic polymers, particular mention may be made of polyolefins, for example polyethylene (PE) or polypropylene (PP), vinyl chloride polymers, including poly(vinyl chloride) (PVC) for example, as well as polymers derived from vinylidene fluoride, including poly (vinylidene fluoride) (PVDF) for example. Good results have been obtained from polyolefins, in particular from PE. High-density polyethylene (HDPE) is most particularly preferred.

In order especially to ensure good adhesion between the body and the COFIT, and therefore good uptake of forces by the latter, the plastic B is preferably compatible with the plastic A or, better still, of a similar chemical nature. By way of pairs of plastics of similar chemical nature, it is possible, for example, to use two ethylene polymers or two vinyl chloride polymers. Their compatibility is thus ensured. These two plastics may also be made compatible by the use of one or more suitable compatibilizers mixed with at least one of them. A layer of adhesive may also be interposed between them.

When a finishing layer is present, good adhesion is desirable between it and the "layer" formed by the COFIT or COFITs at the surface of the body so as to avoid any risk of the finishing layer delaminating. Furthermore, the finishing layer may thus contribute, even if slightly, to taking up the forces. In order to improve this adhesion, the plastic C is advantageously compatible with the plastic B or, better still, of a similar chemical nature. These two plastics may also be rendered compatible by the use of one or more compatibilizers mixed with at least one of them. A layer of adhesive may also be interposed between them.

With the purpose of obtaining good and uniform mechanical properties in the article, the plastics employed are preferably compatible or, better still, of a similar chemical nature.

It is therefore more particularly preferred that the plastics employed should essentially consist of high-density polyethylene.

It is also possible to add any known conventional additive to the plastics employed, for example one or more pigments, processing aids, antioxidants, UV stabilizers, other stabilizers, mineral fillers, etc., as long as their presence does not appreciably affect their mechanical properties.

The body may consist of one or more layers. In particular, bodies may be produced consisting of several separate layers of different plastics. Thus, in the case of a hollow article intended to contain a corrosive fluid, it may be useful to provide, in addition to an external layer comprising a plastic A reinforced with predominantly axial fibres, a thin internal layer consisting of a plastic exhibiting good chemical resistance to the fluid in question. It is possible, for example, to use a vinylidene fluoride polymer for this purpose. In order to ensure adhesion of this internal layer to the adjacent layer, it may be useful to interpose a suitable adhesive between them.

In accordance with the invention, the body is reinforced by reinforcing fibres dispersed within it, substantially parallel to its axis. These fibres may be of any type, for example glass, carbon or aramid fibres. It is preferred to use glass fibres. The diameter of the fibres is generally of the order of 7 to 100 $\mu$m. The reinforcing fibres dispersed within the body are preferably short reinforcing fibres; in particular, their L/D (length/diameter) ratio is of the order of 10 to 10,000. In order to obtain reinforcing fibres having a relatively high and constant length, it is advantageous to employ a plastic A in the form of cylindrical granules of a defined length, for example by means of a first step of extrusion of the plastic with reinforcing fibres of long length followed by a second step of uniform cutting of the rods thus obtained. It is preferred that the quantity of fibres dispersed within the plastic A be from 2 to 30% by volume. It is important that the reinforcing fibres used be dispersed substantially parallel to the axis of the body. If the body does not strictly speaking possess an axis, the axis of the body is generally understood to mean here the direction of its largest dimension.

It is necessary that the chosen fibres be chemically compatible with the plastic A; in order to increase this compatibility, and therefore their adhesion to their matrix, they are possibly coated with a suitable coupling (or sizing) agent. In the case of glass fibres, it is possible, for example, to use for this purpose one of the compounds of the family of silanes well known in this context.

As already mentioned, in the composite article, it is the body which contributes essentially to the uptake of the axial forces. For this purpose, it is advantageous that the material forming the body, that is the plastic A reinforced by the fibres dispersed within it, exhibits a low elongation at break in a tensile test. In particular, the material forming the body advantageously exhibits an elongation at break in a tensile test according to the ISO 527 standard, at a rate of 10 mm/min and at a temperature of 23° C., not exceeding 100%. Preferably, this elongation does not exceed 25%. More preferably still, it does not exceed 15%.

The reinforcing fibres used in the bundle wound around the body may also be of any type, for example one of the types mentioned hereinabove. Here too, it is preferred to use glass fibres. Whatever their nature, these fibres are continuous, that is to say at least of very great length, for example of the order of several hundreds of metres. When the bundle of reinforcing fibres is impregnated by a plastic B, it is preferred to use respective quantities of plastic B and of reinforcing fibres such that the COFIT thus formed contains at least of the order of several hundreds of fibres per $mm^2$ of cross-section. The remark made hereinabove, concerning the compatibility of the glass fibres and the plastic, also applies here.

The characteristics of the composite article according to the invention are preferably determined in such a way that its strength limit with respect to the stresses imposed in service is firstly reached in the axial direction.

The present invention also relates to a continuous process for manufacturing a composite article as described hereinabove, in which the operations of manufacturing the body, of winding the bundle or bundles of reinforcing fibres and, if necessary, of producing the finishing layer take place in line.

The manufacture of the body is carried out by any known process (injection, etc.), so as to orient the reinforcing fibres dispersed within it essentially parallel to its axis.

The winding of the bundle or bundles of continuous reinforcing fibres may be performed by using a planetary device, that is to say a large-sized annular plate, the axis of rotation of which coincides with that of the body to be reinforced, carrying one or more reels for paying out bundles of reinforcing fibres. The speed of rotation of this annular plate is adapted, especially as a function of the speed of translation of the body, of the width of the bundles of reinforcing fibres, of their winding angle, etc., so as to obtain touching turns at the surface of the body. If it is desired to wind several bundles of reinforcing fibres in different directions, it is necessary, of course, to use two such annular plates, axially offset and rotating in opposite directions. It is furthermore preferable, just before the bundles of reinforcing fibres come into contact with the body, to preheat at least the surface layer of one of these two elements to a temperature greater, preferably by more than 5° to 100° C., than the melting or softening temperature of its constituent plastic so as to improve their adhesion. It is also recommended to wind the bundles of reinforcing fibres around the body by applying a certain tension to them.

In the cases where a single bundle of reinforcing fibres is used that is wound virtually perpendicular to the axis of the body, it suffices to use a single annular plate carrying a single reel for paying out bundles of reinforcing fibres, this making it possible to use an extremely simplified manufacturing installation.

After winding the bundle or bundles of continuous reinforcing fibres, it is possible to produce the finishing layer, for example in the case of a body of constant cross-section, bypassing the reinforced body into an extrusion crosshead that is fed with the molten plastic C.

This process is very simple and particularly economical to employ. In particular, if the "deposition" of the finishing layer on the reinforced body takes place immediately after the latter has been reinforced by winding of bundle(s) of continuous reinforcing fibres, the superficial heating of the reinforced body will not require a large amount of energy because of the high temperature to which the body and/or the bundles of reinforcing fibres have generally been superficially preheated before the mandrel is reinforced by the latter.

By way of non-limiting examples, the invention makes it possible especially to produce:

- containers manufactured by injection and intended to contain a pressurized fluid, such as vehicle brake-fluid reservoirs or gas bottles (for example bottles intended for subsea diving, the weight of which is advantageously small compared to their metallic counterparts);
- cylindrical or prismatic solid bars manufactured by extrusion, these being intended to increase the flexural and/or torsional rigidity of various assemblies, such as doors or other parts of vehicles, or alternatively drive shafts.

What is claimed is:

1. A composite article comprising an injected hollow body or a solid body consisting essentially of at least one thermoplastic polymer A, reinforced by at least one bundle of continuous reinforcing fibres, the bundle being wound externally at its surface, substantially perpendicular to its axis, the said body being furthermore reinforced by short reinforcing fibres dispersed within it, substantially parallel to its axis, said short reinforcing fibres having a length/diameter ratio from 10 to 10,000.

2. The composite article according to claim 1, in which the bundle of continuous reinforcing fibres is impregnated by a plastic B.

3. The composite article according to claim 1, coated on the outside with a layer comprising a plastic C.

4. The composite article according to claim 1, in which the plastics employed essentially consist of high-density polyethylene.

5. The composite article according to claim 1, in which the body is reinforced by two bundles of continuous reinforcing fibres wound helically in opposite directions.

6. The composite article according to claim 1, in which the reinforcing fibres are glass fibres.

7. The composite article according to claim 1, in which the plastic A reinforced by the fibres dispersed within it exhibits an elongation at break in a tensile test according to the ISO 527 standard, at a rate of 10 mm/min and at a temperature of 23° C., not exceeding 100%.

8. The composite article according to claim 1, such that its strength limit with respect to the stresses imposed in service is firstly reached in the axial direction.

9. The composite article according to claim 1, comprising no continuous reinforcing fibres wound parallel to its axis.

10. A composite article comprising an injected hollow body or a solid body consisting essentially of high-density polyethylene, reinforced by two bundles of continuous reinforcing glass fibres wound helically in opposite directions, substantially perpendicular to its axis, the body being furthermore reinforced by short reinforcing fibers dispensed within it, substantially parallel to its axis, said short reinforcing fibres having a length/diameter ratio from 10 to 10,000.

11. A continuous process for manufacturing a composite article comprising a solid body according to claim 1, in which the operations of manufacturing the body, of winding the bundle or bundles of reinforcing fibres and, if necessary, of producing the finishing layer take place in line.

* * * * *